(12) United States Patent
Kikko et al.

(10) Patent No.: US 7,975,619 B2
(45) Date of Patent: Jul. 12, 2011

(54) TWO-AXLE TRUCK FOR A RAILWAY CAR AND A RAILWAY CAR

(75) Inventors: Satoshi Kikko, Amagasaki (JP); Takuji Nakai, Kishiwada (JP)

(73) Assignee: Sumitomo Metal Industries, Ltd., Osaka (JP)

(*) Notice: Subject to any disclaimer, the term of this patent is extended or adjusted under 35 U.S.C. 154(b) by 0 days.

(21) Appl. No.: 12/712,274

(22) Filed: Feb. 25, 2010

(65) Prior Publication Data

US 2010/0236446 A1   Sep. 23, 2010

Related U.S. Application Data

(63) Continuation of application No. PCT/JP2008/064999, filed on Aug. 22, 2008.

(30) Foreign Application Priority Data

Aug. 28, 2007 (JP) ................................. 2007-221329

(51) Int. Cl.
B61D 1/00 (2006.01)

(52) U.S. Cl. ........................................ 105/165; 105/167

(58) Field of Classification Search ............... 105/163.2, 105/157.1, 166, 167, 168, 169, 171, 178, 105/182.1, 215.1, 215.2; 104/244, 243, 245, 104/247; 295/1

See application file for complete search history.

(56) References Cited

U.S. PATENT DOCUMENTS 1,858,929 A * 5/1932 Harry ........................... 295/31.1

FOREIGN PATENT DOCUMENTS

| JP | 62-163175 | 10/1987 |
|----|-----------|---------|
| JP | 2738114 | 1/1998 |
| JP | 10-250574 | 9/1998 |

OTHER PUBLICATIONS

"Properties of Trucks and Tracks When Traveling Along a Sharp Curve and Their Effect on Rail Corrugation", J-Rail 1995 (1995 Railway Technology Joint Symposium in Japan).

* cited by examiner

Primary Examiner — Mark T Le

(74) Attorney, Agent, or Firm — Clark & Brody

(57) ABSTRACT

Lateral pressure which develops in the front wheelset when traveling along a curved track is decreased while suppressing an increase in costs as much as possible. A two-axle truck for a railway car has a front wheelset having wheels with a first tread gradient and a rear wheelset having wheels with a second tread gradient which is different from the first tread gradient. The tread gradient of the wheels of the rear wheelset is larger than the tread gradient of the wheels of the front wheelset.

1 Claim, 6 Drawing Sheets

TWO-AXLE TRUCK FOR A RAILWAY CAR AND A RAILWAY CAR

This application is a continuation of International Patent Application No. PCT/JP2008/064999, filed Aug. 22, 2008. This PCT application was not in English as published under PCT Article 21(2).

TECHNICAL FIELD

This invention relates to a two-axle truck for a railway car and a railway car equipped with this two-axle truck for a railway car.

BACKGROUND ART

FIG. 7 is an explanatory view showing the state of a two-axle truck 1 for a railway car when traveling along a curved track.

As shown in FIG. 7, when the truck 1 is traveling along a curved track, the force F1 to the left and right (referred to in this description as the "lateral force") between the wheel 3 on the outer side of the wheelset 2f on the front side in the direction of travel (referred to below as the front wheelset) and the rail 5 on the outer side of the curved track increases.

FIG. 8 is an explanatory view showing the relationship between the wheels 3 of the front wheelset 2f when traveling along a curved track and the rails 5 of the curved track.

As shown in FIG. 8, when a truck is traveling along a curved track, the attack angle α which is the relative yawing angle between the front wheelset 2f and the rails 5 (as shown in FIG. 8, on a curved track, the direction in which the wheelset faces the outer rail is given a positive value) increases. Therefore, excessive sliding of the wheels 3 in the lateral direction (referred to as lateral creep) develops. As a result, as shown by the arrow in FIG. 7, yawing develops in the truck 1, and a lateral force F1 develops in the front wheelset 2f of the truck 1.

On the other hand, in the wheelset 2r on the rear side in the direction of travel (referred to below as the rear wheelset), there is almost no lateral displacement, and there is almost no difference in the radius of rotation of the left and right wheels 3. Therefore, the necessary difference in the wheel radius between the inner and outer rails 5 (referred to as the pure rolling radius difference) cannot be obtained, and excessive sliding of the wheels 3 in the longitudinal direction (referred to as longitudinal creep) develops. The longitudinal creep force F2 in the rear wheelset 2r which develops in this manner causes an increase in the lateral force F1 in the front wheelset 2f.

Non-Patent Document 1 listed below describes that there is a large possibility that firstly longitudinal creep in the rear wheelset and secondly lateral creep in the front wheelset are the primary causes of rail corrugation which develops in the inside rail of a sharp curved track. Thus, it is thought that the occurrence of this rail corrugation can be suppressed if lateral creep (lateral pressure) of the front wheelset and longitudinal creep of the rear wheelset can be decreased.

Patent Document 1 listed below discloses, with the intension of decreasing the lateral pressure, an invention which varies the rigidity of the front and rear axle box suspensions which rotatably support the front wheelset and the rear wheelset, respectively, and an invention in which the wheels of the rear wheelset are independent of each other.
Patent Document 1: Japanese Patent No. 2738114
Non-Patent Document 1: "Properties of Trucks and Tracks When Traveling Along a Sharp Curve and Their Effect on Rail Corrugation", J-Rail 1995 (1995 Railway Technology Joint Symposium in Japan)

SUMMARY OF THE INVENTION

Problem which the Invention is to Solve

In order to carry out the invention disclosed in Patent Document 1, it is necessary to reconstruct the axle box suspensions and the wheelsets of an existing truck, and doing so is enormously expensive.

FIG. 1 is an explanatory view showing in enlarged form an example of a wheel 7 having a tread 6 with a basic conical shape. As shown in FIG. 1, the tread 6 of the wheel 7 is provided with a tread gradient in order to provide both the ability to move linearly when traveling on a straight track and maneuverability when traveling along a curved track. The tread gradient γ is defined by the equation $\gamma = \tan\theta$, wherein θ is the angle of the tread 6 with respect to a horizontal plane at a wheel reference point Z which is the intersection between the tread 6 and a base line L which is set for each wheel at approximately the center in the widthwise direction of the wheel 7 for measuring the wheel radius R. The tread gradient γ is normally set to be in the range of 0.03-0.06. In a two-axle truck for a railway car, the tread gradient is set to be the same for all four wheels.

As a result of diligent investigation, the present inventors found that by making the tread gradient provided on the wheels of one wheelset different from the tread gradient provided on the wheels of the other wheelset, the above-described problems can be solved, and they completed the present invention.

The present invention is a two-axle truck for a railway car characterized by having a first wheelset having wheels with a first tread gradient and a second wheelset having wheels with a second tread gradient which is different from the first tread gradient. A two-axle truck for a railway car according to the present invention can decrease lateral pressure which develops in the front wheelset when traveling along a curved track without changing the structure of the axle box suspensions or of the wheelsets of an existing truck.

When using a two-axle truck for a railway car according to the present invention, of the first wheelset and the second wheelset, the wheelset having wheels with a larger tread gradient is disposed to the rear in the direction of travel. In a two-axle truck for a railway car according to the present invention, the wheels of the front wheelset have a usual tread gradient γ which is in the range of 0.03-0.06, so stable running properties are guaranteed on a straight track, while the tread gradient of the wheels in the rear wheelset is made larger than the tread gradient of the wheels in the front wheelset, whereby excessive longitudinal sliding is decreased, and lateral pressure which develops in the front wheelset when traveling along a curved track can be decreased.

From another standpoint, the present invention is a railway car having a front and rear two-axle truck, and the front truck which is positioned on the front side in the direction of travel which experiences a larger lateral pressure than the rear truck which is positioned to the rear in the direction of travel or both the front truck and the rear truck use the above-described two-axle truck for a railway car according to the present invention having a wheelset having wheels with a tread gradient which is larger on the rear side in the direction of travel. According to the present invention, the wheels in the forward-most wheelset have the above-described usual tread gradient, so stable running properties are guaranteed on a straight track, while the tread gradient of the wheels of the rear wheelset of the front truck is made larger than the tread gradient of the wheels in the front wheelset of that truck, whereby lateral pressure which is generated in the front wheelset at the time of running on a curved track can be decreased.

The present invention is also a railway vehicle having a front and rear two-axle truck characterized in that the truck which is positioned on the front side in the direction of travel is the above-described two-axle truck for a railway car according to the present invention in which the wheels of the wheelset on the rear side in the direction of travel have a larger tread gradient, and in the truck which is positioned on the rear side in the direction of travel, the tread gradient of the wheels of the wheelset on the front side in the direction of travel is larger than the tread gradient of the wheels of the wheelset on the rear side in the direction of travel. As a result, even when the direction of travel of the railway car is changed, the stability of movement on a straight track is guaranteed while the lateral pressure which is generated in the front wheelset when traveling along a curved track can be decreased.

The present invention can be carried out using an existing truck without modifications by simply changing the tread gradient of the wheels. Therefore, an increase in costs can be minimized, and lateral pressure which develops in the front wheelset when running along a curved track can be decreased. As a result, lateral pressure in the front wheelset and the longitudinal creep force in the rear wheelset can both be decreased, whereby rail corrugation which develops in the rail on the inner side of a sharply curved track can be suppressed.

DETAILED DESCRIPTION OF THE INVENTION

The progress from the conception of the present invention up to solving the problem and the best mode for carrying out the present invention will be explained while referring to FIGS. 1-6.

Figure 2:
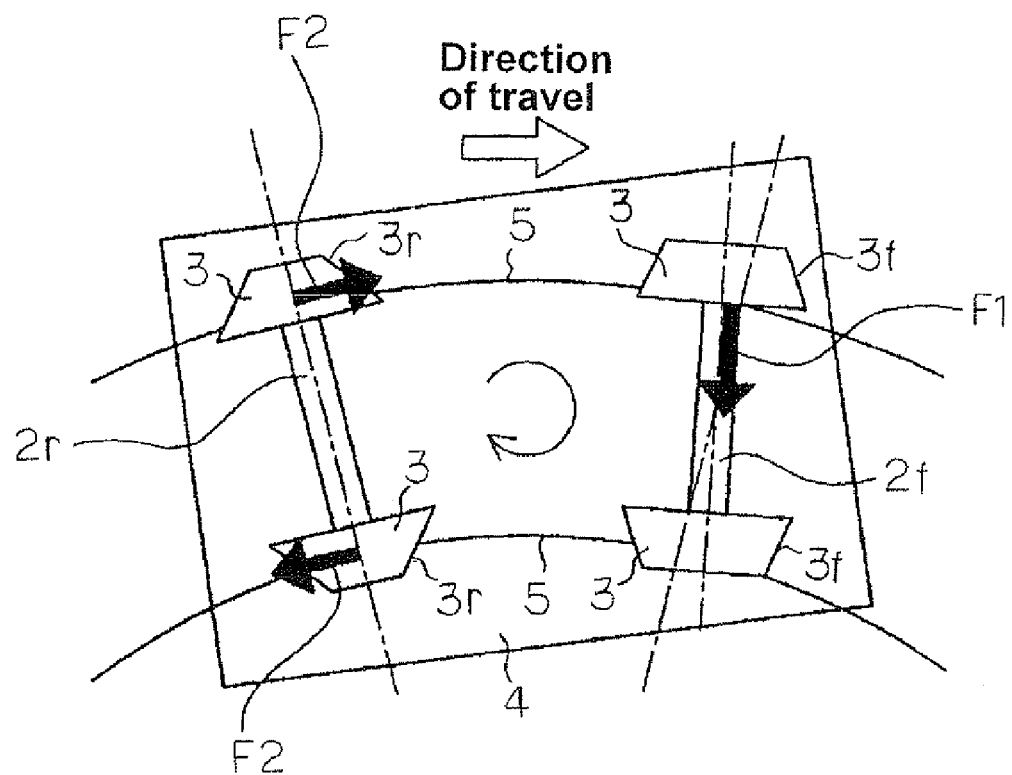
FIG. 2 is an explanatory view showing the state when a two-axle truck for a railway car according to the present invention is traveling along a curved track.

FIG. 2 is an explanatory view showing the state in which a two-axle truck 4 for a railway car according to the present invention is traveling along a curved track.

When the two-axle truck 4 for a railway car is traveling along a curved track, the longitudinal creep force F2 which develops in the rear wheelset 2r can be decreased by providing the necessary difference in the radius of the wheels on the inner and outer rails 5. For this purpose, by setting the tread gradient $\gamma_{3r}$ of the treads 3r of the wheels 3 in the rear wheelset 2r to a large value so that the rear wheelset 2r is slightly displaced to the outer side, the radius difference becomes close to the radius difference for pure rolling, and the longitudinal creep force F2 can be decreased. If the tread gradient $\gamma_{3r}$ of the treads 3r of the wheels 3 of the rear wheelset 2 is made still larger, it is possible to obtain a difference in the wheel radius which is equal to or even larger than the radius difference for pure rolling. At this time, the effect is obtained that the longitudinal creep force F2 further decreases the lateral pressure which develops in the wheel 3 on the outer side of the front wheelset 2f.

However, if not only the tread gradient $\gamma_{3r}$ of the treads 3r of the wheels 3 of the rear wheelset 2r but also the tread gradient $\gamma_{3f}$ of the treads 3f of the wheels 3 of the front wheelset 2f is set to a large value, the stability of running along a straight track is decreased. Therefore, by setting only the tread gradient $\gamma_{3r}$ of the treads 3r of the wheels 3 of the rear wheelset 2r to a large value and making the tread gradient $\gamma_{3f}$ of the treads 3f of the wheels 3 of the front wheelset 2f be a usual tread gradient in the range of 0.03-0.06, running stability along a straight track can also be guaranteed.

With a two-axle truck 1 for a railway car according to the present invention, the running stability along a straight track is increased more than when the tread gradients $\gamma_{3f}$ and $\gamma_{3r}$ of the treads 3f and 3r of the wheels 3, 3 of the front and rear wheelsets 2f and 2r are both set to a large value. As shown in FIG. 2, when traveling along a curved track, by slightly displacing the rear wheelset 2r towards the outer side, the lateral pressure which develops in the wheel 3 on the outer side of the front wheelset 2f is decreased. As a result, lateral pressure when traveling along a curved track can be decreased while running stability along a straight track can be maintained.

The present invention is based on the above-described concept. Next, the effects of the present invention will be explained.

In order to ascertain the effects of the present invention, a simulation was carried out of the situation in which a suburban commuter rail car is traveling at 75 km/hour along a curved track with a radius of 300 m and a cant of 105 mm. The tread gradient $\gamma$ of the front wheelset on which the simulation was carried out was set to 0.05.

Figure 3:
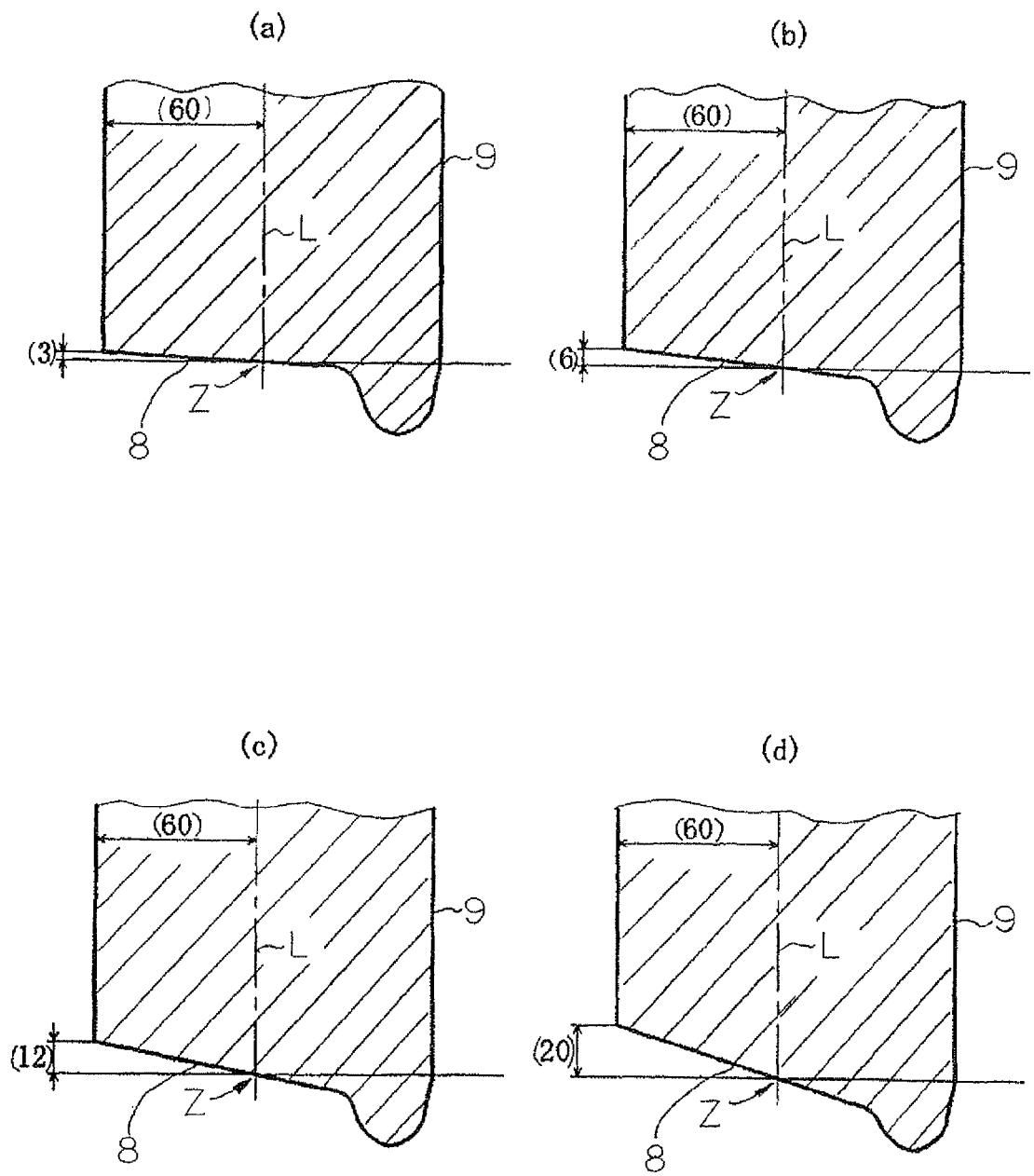
FIG. 3 is an explanatory view showing the tread of a rear wheel on which a simulation was carried out, FIG. 3(a) showing the case in which the tread gradient was 0.05, FIG. 3(b) showing the case in which the tread gradient was 0.10, FIG. 3(c) showing the case in which the tread gradient was 0.20, and FIG. 3(d) showing the case in which the tread gradient was 0.33.

FIG. 3 is an explanatory view showing the tread 8 of the rear wheels 9 on which the simulation was carried out. FIG. 3(a) shows the case in which the tread gradient $\gamma$ was 0.05, FIG. 3(b) shows the case in which the tread gradient $\gamma$ was 0.10, FIG. 3(c) shows the case in which the tread gradient $\gamma$ was 0.20, and FIG. 3(d) shows the case in which the tread gradient $\gamma$ was 0.33.

Figure 1:
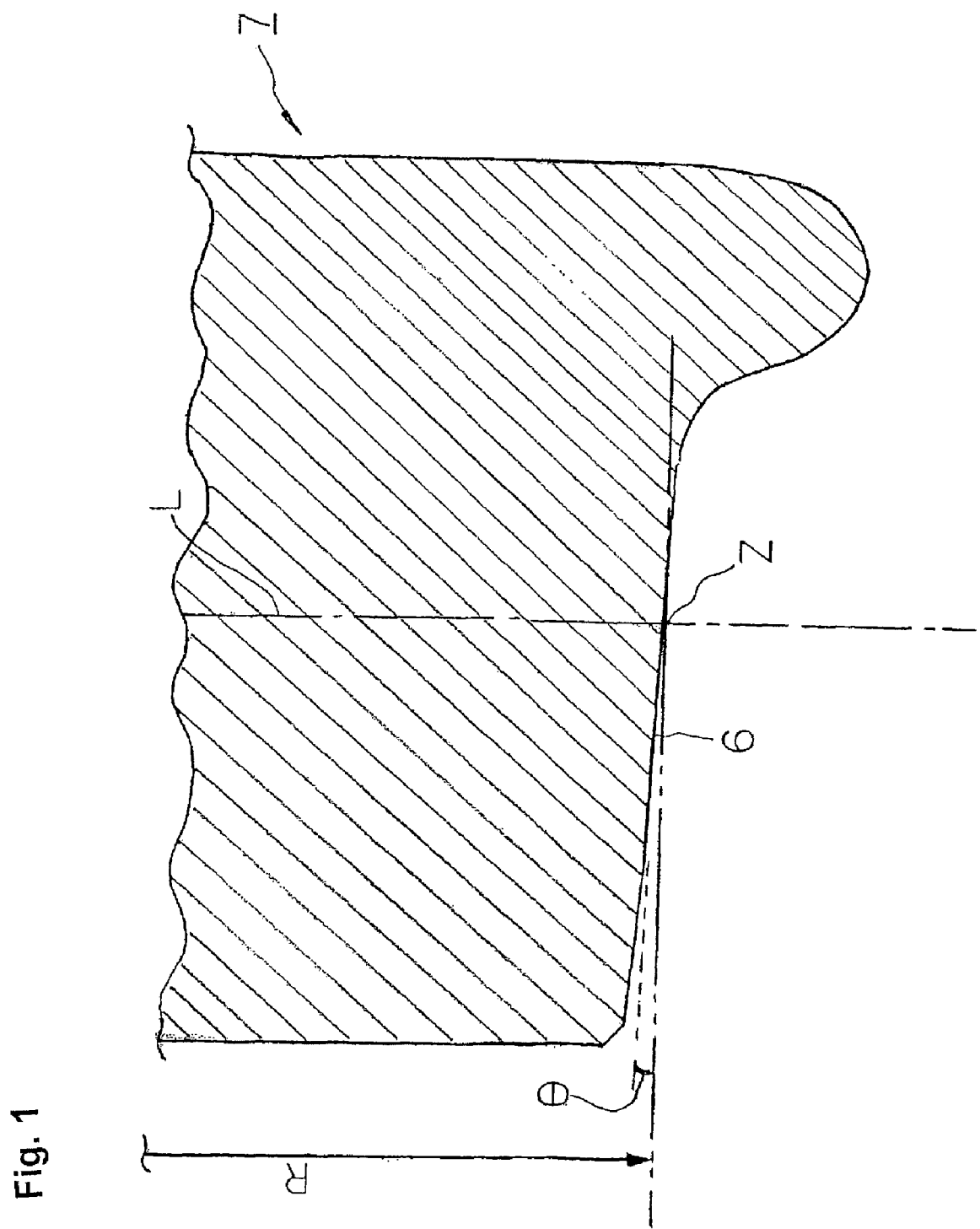
FIG. 1 is an explanatory view of an example of a wheel having a tread with a basic conical shape.

In FIGS. 3(a)-3(d), in the same manner as in FIG. 1, L indicates a reference line, and Z indicates a reference point on the wheel. The dimensions shown in FIGS. 3(a)-3(d) vary with the specifications of the wheel and the like and they are merely examples.

In this simulation, in addition to the lateral force F1 which develops in the wheel on the outer side of the front wheelset and the longitudinal creep force F2 which develops in the rear wheelset, the sum F1+F2 of the lateral force F1 and the longitudinal creep force F2 which develop in the wheel on the outer side was investigated. This sum, referred to below as the overall creep force, affects the occurrence of rail corrugation. When the overall creep force (F1+F2) is small, it is difficult for rail corrugation to develop.

Figure 4:
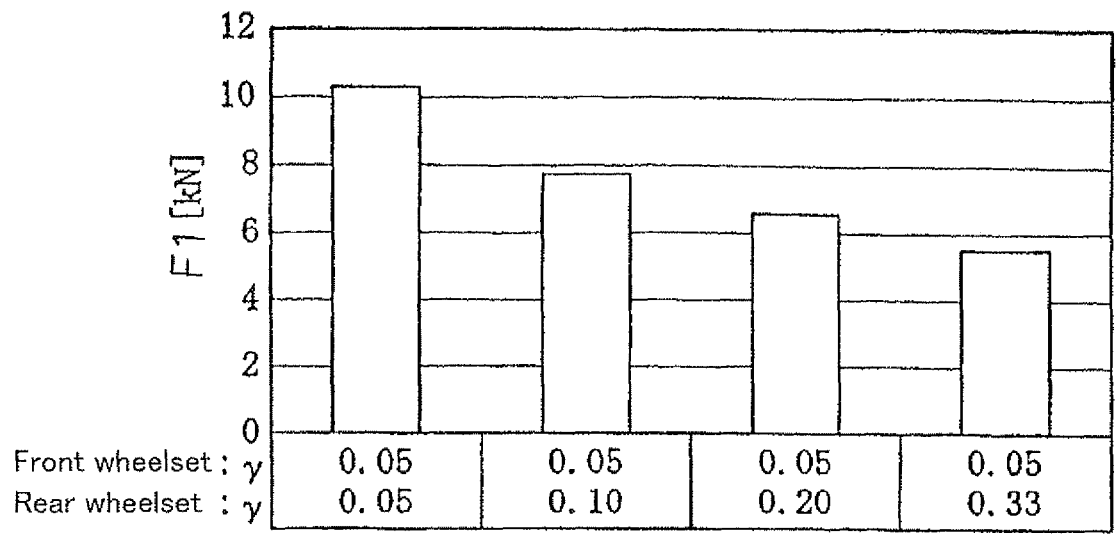
FIG. 4 is a graph showing a comparison of the lateral pressure which developed in the wheel on the outer side of the front wheelset when wheels having various treads gradients were combined.
Figure 5:
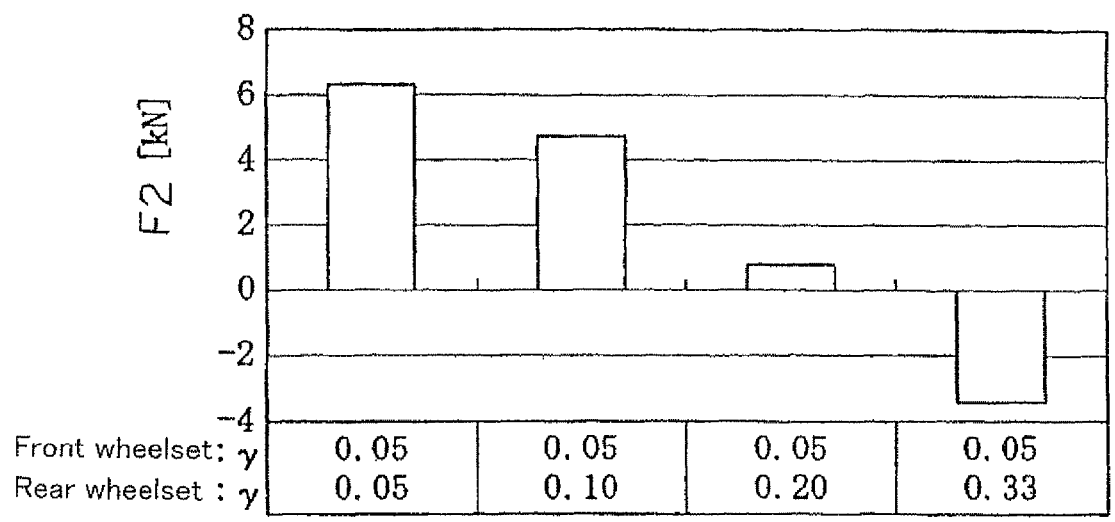
FIG. 5 is a graph showing a comparison of the longitudinal creep force which developed in the rear wheelset when wheels having various tread gradients were combined.
Figure 6:
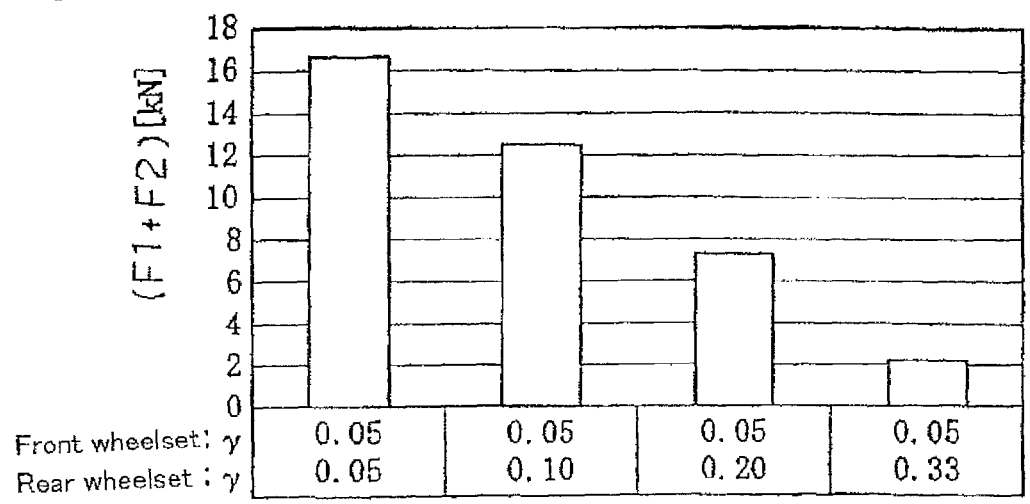
FIG. 6 is a graph showing a comparison of the overall creep force when wheels having various tread gradients were combined.
Figure 7:
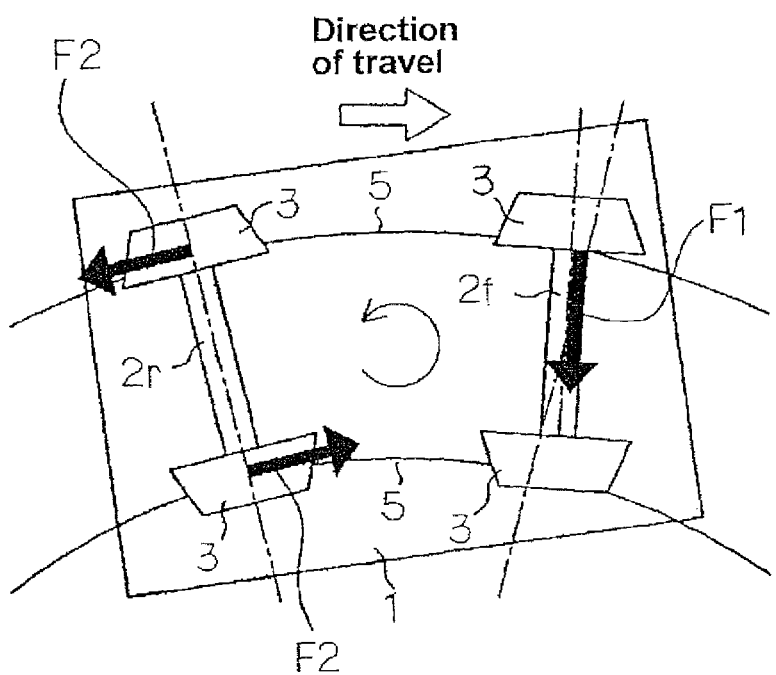
FIG. 7 is an explanatory view showing the state when a two-axle truck for a railway car is traveling along a curved track.
Figure 8:
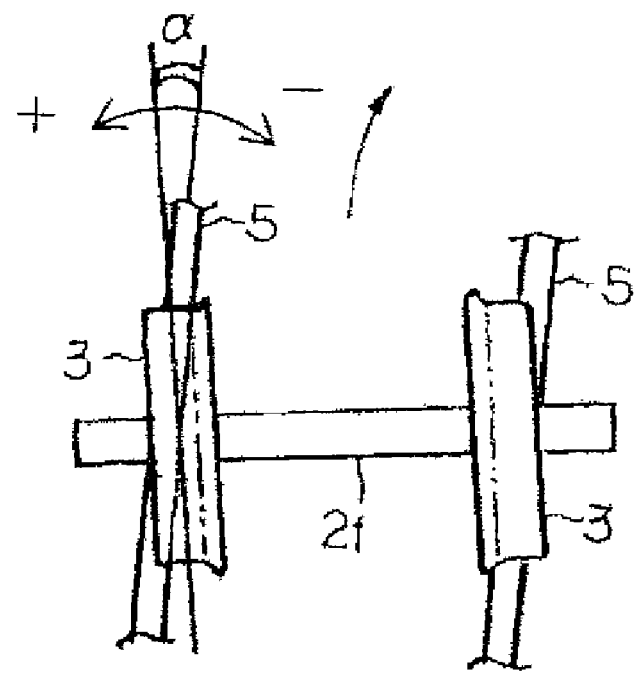
FIG. 8 an explanatory view showing the relationship between the wheels of the front wheelset when traveling along a curved track and the rails of the curved track.

The results of the simulation are shown in Table 1 and FIGS. 4-6. FIG. 4 is a graph comparing the lateral force F1 (kN) which developed in the wheel on the outer side of the front wheelset when wheels having various tread gradients were combined, FIG. 5 is a graph comparing the longitudinal creep force F2 (kN) which developed in the rear wheelset in each case, and FIG. 6 is a graph comparing the overall creep force (F1+F2) in each case.

TABLE 1

| Tread combination | Front axle $\gamma = 0.05$ Rear axle | | | |
|---|---|---|---|---|
| | $\gamma = 0.05$ | $\gamma = 0.10$ | $\gamma = 0.20$ | $\gamma = 0.33$ |
| F1 | 10.34 | 7.77 | 6.6 | 5.53 |
| F2 | 6.26 | 4.71 | 0.77 | −3.39 |
| (F1 + F2) | 16.6 | 12.48 | 7.36 | 2.13 |
| % Decrease in overall creep force compared to when $\gamma = 0.05$ for front and rear axle | — | Δ24.8 | Δ55.7 | Δ87.1 |

In the examples of the present invention in which the tread gradient γ of the wheels of the rear wheelset was 0.10, 0.20, or 0.33, when a truck 4 was traveling along a curved track as shown in FIG. 2, the lateral force F1 which developed in the wheel on the outer side of the front wheelset decreased as shown in Table 1 and FIG. 4. Namely, by setting the tread gradient of the wheels of the rear wheelset to be larger than the tread gradient of the wheels of the front wheelset, the rear wheelset was positioned slightly to the outer side, and the amount of deficiency of the difference in the rolling radius difference between the wheels on the left and the right of the rear wheelset was decreased.

As shown in Table 1 and FIG. 5, as the deficiency in the radius difference decreases, the longitudinal creep force F2 also decreases. If the radius difference becomes too large, a longitudinal creep force develops in the opposite direction. A moment due to this longitudinal creep force causes the lateral force F1 which develops between the outer rail and the front wheelset. Therefore, a decrease in the longitudinal creep which can be achieved can result in a decrease in the lateral force F1.

According to the present invention, since the lateral force F1 and the longitudinal creep force F2 are both decreased, as shown in Table 1 and FIG. 6, the overall creep force (F1+F2) also decreases. As a result, rail corrugation which develops in the inner rail of a sharp curve can be suppressed.

The present invention can be applied not only to a usual two-axle truck but also to an articulated two-axle truck which is positioned in the connecting portion of two cars connected to each other.

Furthermore, a truck according to the present invention can employ any type of mechanism for connecting it to the body of a rail car such as a swing bolster hanging mechanism or a bolsterless mechanism.

INDUSTRIAL APPLICABILITY

The present invention can be used in a truck for a railway car traveling along a sharp curved track where rail corrugation develops.

The invention claimed is:
1. A railway car having front and rear two-axle trucks, characterized in that the front two-axle truck positioned in front in a direction of travel has front and rear wheelsets, the rear wheelset having wheels with a larger tread gradient than a corresponding tread gradient of wheels of the front wheelset; and the rear two-axle truck has front and rear wheelsets and is positioned in rear in the direction of travel, a tread gradient of wheels of the front wheelset of the rear two-axle truck is larger than a tread gradient of wheels of the rear wheelset of the rear two-axle truck.

\* \* \* \* \*